US008530537B2

(12) United States Patent  (10) Patent No.: US 8,530,537 B2
Choi et al.  (45) Date of Patent: Sep. 10, 2013

(54) BLACK PHOTOSENSITIVE RESIN COMPOSITION AND LIGHT BLOCKING LAYER USING THE SAME

(75) Inventors: Hyun-Moo Choi, Uiwang-si (KR); Hye-Kyoung Cho, Uiwang-si (KR); Ji-Won Woo, Uiwang-si (KR); Choun-Woo Lee, Uiwang-si (KR); Gyu-Seok Han, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/161,552

(22) Filed: Jun. 16, 2011

(65) Prior Publication Data

US 2012/0077897 A1  Mar. 29, 2012

(30) Foreign Application Priority Data

Sep. 29, 2010  (KR) .................. 10-2010-0094516
Nov. 25, 2010  (KR) .................. 10-2010-0118331

(51) Int. Cl.
*C08F 290/06*  (2006.01)
*B29C 71/04*  (2006.01)
*H05B 6/68*  (2006.01)
*A61L 24/00*  (2006.01)

(52) U.S. Cl.
USPC ............... 522/81; 522/71; 522/1; 522/189

(58) Field of Classification Search
USPC ............................... 522/81, 71, 1, 189
See application file for complete search history.

(56) References Cited

U.S. PATENT DOCUMENTS

| | | | |
|---|---|---|---|
| 4,500,897 A | 2/1985 | Matsuda et al. | |
| 4,762,752 A | 8/1988 | Habennestel et al. | |
| 5,424,167 A | 6/1995 | Uetani et al. | |
| 5,707,432 A | 1/1998 | Adams et al. | |
| 5,708,055 A | 1/1998 | Joyce et al. | |
| 5,710,234 A | 1/1998 | Fujishiro et al. | |
| 5,721,076 A | 2/1998 | Wantanabe et al. | |
| 5,803,959 A | 9/1998 | Johnson et al. | |
| 5,851,280 A | 12/1998 | Belmont et al. | |
| 5,895,522 A | 4/1999 | Belmont et al. | |
| 5,922,118 A | 7/1999 | Johnson et al. | |
| 5,968,243 A | 10/1999 | Belmont et al. | |
| 6,110,994 A | 8/2000 | Cooke et al. | |
| 6,232,025 B1 | 5/2001 | Srinivasan | |
| 6,277,183 B1 | 8/2001 | Johnson et al. | |
| 6,328,894 B1 | 12/2001 | Chan et al. | |
| 6,780,389 B2 | 8/2004 | Karl et al. | |
| 6,960,250 B2 | 11/2005 | Luethge et al. | |
| 7,132,154 B2 | 11/2006 | Shibahara et al. | |
| 7,250,209 B2 | 7/2007 | Shibahara et al. | |
| 7,376,328 B2 | 5/2008 | Takase et al. | |
| 7,592,119 B2 | 9/2009 | Nomura | |
| 7,768,600 B2 | 8/2010 | Kaihoko et al. | |
| 7,794,917 B2 | 9/2010 | Mori et al. | |
| 8,038,785 B2 * | 10/2011 | Miyake .................. 106/31.9 |
| 2002/0187412 A1 | 12/2002 | You et al. | |
| 2004/0126592 A1 | 7/2004 | Shibahara et al. | |
| 2005/0164120 A1 | 7/2005 | Yamaoka et al. | |
| 2006/0041053 A1 | 2/2006 | Kamata et al. | |
| 2007/0101903 A1 | 5/2007 | Lee et al. | |
| 2007/0161110 A1 | 7/2007 | Iida et al. | |
| 2008/0090177 A1 * | 4/2008 | Oh et al. ............... 430/280.1 |
| 2009/0207490 A1 | 8/2009 | Moriyama et al. | |
| 2010/0085518 A1 | 4/2010 | Choi et al. | |
| 2010/0163811 A1 * | 7/2010 | Oh et al. ............... 252/586 |
| 2010/0227178 A1 | 9/2010 | Oouchi et al. | |

FOREIGN PATENT DOCUMENTS

| | | |
|---|---|---|
| CN | 1606597 | 4/2005 |
| CN | 1606600 | 4/2005 |
| CN | 101128544 A | 2/2008 |
| CN | 101261334 A | 9/2008 |
| CN | 101770172 A | 7/2010 |
| EP | 1471112 A1 | 10/2004 |
| JP | 60237403 | 11/1985 |
| JP | 10-253820 A | 9/1988 |
| JP | 1152449 | 6/1989 |
| JP | 1200353 | 8/1989 |
| JP | 4007373 | 1/1992 |
| JP | 4091173 | 3/1992 |
| JP | 4163552 | 6/1992 |
| JP | 05-339356 A | 12/1993 |
| JP | 06-001938 A | 1/1994 |
| JP | 07-064281 A | 3/1995 |
| JP | 07-064282 A | 3/1995 |
| JP | 08-278630 A | 10/1996 |
| JP | 09-022653 A | 1/1997 |
| JP | 09-291224 | 11/1997 |
| JP | 09-304929 | 11/1997 |
| JP | 10-010311 A | 1/1998 |

(Continued)

OTHER PUBLICATIONS

Office Action in commonly owned U.S. Appl. No. 13/217,581 mailed Jan. 6, 2012, pp. 1-16.
Office Action in commonly owned U.S. Appl. No. 13/161,542 mailed Jan. 6, 2012, pp. 1-14.
Office Action in commonly owned U.S. Appl. No. 13/241,434 mailed Jan. 23, 2012, pp. 1-19.
Office Action in commonly owned U.S. Appl. No. 11/473,876 mailed on Dec. 18, 2008, pp. 1-17.
Notice of Allowance in commonly owned U.S. Appl. No. 11/473,876 mailed on Jul. 17, 2009, pp. 1-6.
Office Action in commonly owned U.S. Appl. No. 12/504,409 mailed on Nov. 18, 2010, pp. 1-12.
Machine Translation of JP 07064282 A, pp. 1-23.
Machine Translation of KR 2003057090 A, pp. 1-14.
Office Action in commonly owned copending U.S. Appl. No. 12/323,554, mailed on Jun. 24, 2009, pp. 1-25.
English abstract of JP 2004-292672, published Oct. 21, 2004, pp. 1-3.
English abstract of JP 10-204321, published Aug. 4, 1998, pp. 1-3.
English abstract of JP 2004-251946, published Sep. 9, 2004, pp. 1-4.
English abstract of JP 2004-029745, published Jan. 29, 2004, pp. 1-4.
English abstract of JP 2004-004762, published Jan. 8, 2004, pp. 1-4.
English abstract of JP 2004-075985, published Mar. 11, 2004, pp. 1-5.

(Continued)

*Primary Examiner* — Ling Choi
*Assistant Examiner* — Jessica E Whiteley
(74) *Attorney, Agent, or Firm* — Summa, Additon & Ashe, P.A.

(57) ABSTRACT

Disclosed are a black photosensitive resin composition that includes (A) an organic binder resin, (B) a reactive unsaturated compound, (C) a photopolymerization initiator, (D) a black pigment including carbon black and a silver-tin-containing alloy, and (E) a solvent, and a light blocking layer using the same.

8 Claims, 1 Drawing Sheet

(56) References Cited

FOREIGN PATENT DOCUMENTS

| | | |
|---|---|---|
| JP | 10-067970 | 3/1998 |
| JP | 10-204321 A | 8/1998 |
| JP | 10218973 A | 8/1998 |
| JP | 10-510861 | 10/1998 |
| JP | 11-060989 A | 3/1999 |
| JP | 11231523 A | 8/1999 |
| JP | 2000-056120 | 2/2000 |
| JP | 2000-171969 A | 6/2000 |
| JP | 2001-040022 A | 2/2001 |
| JP | 2001-131241 | 5/2001 |
| JP | 2002-047423 | 2/2002 |
| JP | 2002-145999 | 5/2002 |
| JP | 3287661 B2 | 6/2002 |
| JP | 2003-066597 | 3/2003 |
| JP | 2003-149810 | 5/2003 |
| JP | 2004-004762 A | 1/2004 |
| JP | 2004-029745 A | 1/2004 |
| JP | 2004-186227 | 7/2004 |
| JP | 2004-198717 A | 7/2004 |
| JP | 2004-251946 A | 9/2004 |
| JP | 2004-292672 A | 10/2004 |
| JP | 2004-075985 A | 11/2004 |
| JP | 2005-215149 | 8/2005 |
| JP | 2008-051934 * | 8/2006 |
| JP | 2007-071994 | 3/2007 |
| JP | 2007-164072 | 6/2007 |
| JP | 2007-264489 | 10/2007 |
| JP | 2007-304207 | 11/2007 |
| JP | 2007-304210 | 11/2007 |
| JP | 2008-164937 A | 7/2008 |
| KR | 1019910004717 B1 | 7/1991 |
| KR | 1019920005780 B1 | 7/1992 |
| KR | 1019940005617 B1 | 6/1994 |
| KR | 94-7778 | 8/1994 |
| KR | 10-1995-7002313 | 6/1995 |
| KR | 95-11163 | 9/1995 |
| KR | 95-7003746 | 9/1995 |
| KR | 96-11513 | 1/1999 |
| KR | 93-700858 | 7/2000 |
| KR | 10-0264691 | 9/2000 |
| KR | 95-700359 | 1/2001 |
| KR | 92-702502 | 12/2002 |
| KR | 2003-057090 | 7/2003 |
| KR | 96-29904 | 5/2004 |
| KR | 10-2006-0041154 A | 5/2006 |
| KR | 2006-70772 A | 6/2006 |
| KR | 10-2006-0076412 A | 7/2006 |
| KR | 10-0725023 B1 | 5/2007 |
| KR | 10-2008-0025097 A | 3/2008 |
| KR | 10-2009-0026037 A | 3/2009 |
| KR | 10-2010-0047648 A | 5/2010 |
| KR | 10-2010-0053090 A | 5/2010 |
| KR | 10-2010-0053476 A | 5/2010 |
| TW | 200616897 | 6/2006 |
| TW | 200700903 | 1/2007 |
| WO | 2004/055597 A1 | 7/2004 |
| WO | 2006/044676 A2 | 4/2006 |
| WO | 2006/093245 A1 | 9/2006 |
| WO | WO2007/015573 * | 2/2007 |
| WO | 2008047992 A1 | 4/2008 |
| WO | 2010/050650 A1 | 5/2010 |

OTHER PUBLICATIONS

English abstract of JP 2004-198717, published Jul. 15, 2004, pp. 1-6.
English abstract of JP 10-253820, published Sep. 25, 1998, pp. 1-3.
English abstract of JP 10-010311, published Jan. 16, 1998, pp. 1-3.
English abstract of JP 11-060989, published Mar. 5, 1999, pp. 1-2.
English abstract of JP 09-022653, published Jan. 21, 1997, pp. 1-2.
Taiwanese Office Action in commonly owned Taiwanese Application No. 095144145 dated Jun. 4, 2010, pp. 1-5.
English translation of Taiwanese Search Report in commonly owned Taiwanese Application No. 095144145 dated May 11, 2010, pp. 1.
Office Action in commonly owned U.S. Appl. No. 12/323,554 mailed Dec. 29, 2009, pp. 1-18.
English Translation of Abstract for Korean Patent Application 92-702502, pp. 1.
English Translation of Abstract for Korean Patent Application 93-700858, pp. 1.
English Translation of Abstract for Korean Patent Application 94-7778, pp. 1.
English Translation of Abstract for Korean Patent Application 95-11163, pp. 1.
English Translation of Abstract for Korean Patent Application 95-700359, pp. 1.
English Translation of Abstract for Korean Patent Application 95-703746, pp. 1.
English Translation of Abstract for Korean Patent Application 96-11513, pp. 1.
English Translation of Abstract for Korean Patent Application 96-29904, pp. 1.
International Search Report in commonly owned International Application No. PCT/KR2007/002908, dated Sep. 21, 2007, pp. 1-2.
Chinese Search Report in counterpart Chinese Application No. 201110145446X dated Nov. 23, 2012, pp. 1-2.
Taiwanese Search Report in counterpart Taiwanese Application No. 099145202 dated Apr. 15, 2013, pp. 1.

* cited by examiner

BLACK PHOTOSENSITIVE RESIN COMPOSITION AND LIGHT BLOCKING LAYER USING THE SAME

CROSS-REFERENCE TO RELATED APPLICATIONS

This application claims priority under 35 USC Section 119 to and the benefit of Korean Patent Application Nos. 10-2010-0094516 and 10-2010-0118331 filed in the Korean Intellectual Property Office on Sep. 29, 2010, and Nov. 25, 2010, respectively, the entire disclosure of each of which is incorporated herein by reference.

FIELD OF THE INVENTION

The present invention relates to a black photosensitive resin composition and a light blocking layer using the same.

BACKGROUND

Black photosensitive resin compositions are used to fabricate display elements for color filters, liquid crystal display materials, organic light emitting elements (EL), display panel materials, and the like. For example, a color filter such as a color liquid crystal display and the like requires a light blocking layer on the border between colored layers such as red, green, blue, and the like to enhance display contrast or color effects. This light blocking layer may be primarily formed of a black photosensitive resin composition.

Japanese Patent Laid-Open Publication No. 2002-047423 is directed to the use of a cobalt oxide as a black pigment stated to provide a black matrix with high blackness and insulation properties. Japanese Patent Laid-Open Publication No. 2007-071994 is directed to a black matrix material including a perylene-based compound.

Recent research on black matrix materials has focused on maximizing optical density (OD) and also decreasing the thickness of a black matrix film to minimize damage to the flatness thereof due to high film thickness and thus securing drip margins of a liquid crystal without an overcoat.

SUMMARY

The present invention provides a black photosensitive resin composition that can have a high optical density without damaging surface properties (such as flatness) of a layer formed using the same. The black photosensitive resin composition can also provide excellent patterning properties and resolution, and low dielectric constant.

The present invention also provides a light blocking layer prepared by using the black photosensitive resin composition.

The black photosensitive resin composition includes (A) an organic binder resin; (B) a reactive unsaturated compound; (C) a photopolymerization initiator; (D) black pigment including carbon black and a silver-tin-containing alloy; and (E) a solvent, wherein the silver-tin-containing alloy includes silver and tin at a weight ratio of about 6:4 to about 8:2.

The carbon black and the silver-tin-containing alloy may be included at a weight ratio of about 1:9 to about 9:1.

The black photosensitive resin composition may include about 0.5 to about 20 wt % of the organic binder resin (A); about 1 to about 20 wt % of the reactive unsaturated compound (B); about 0.1 to about 10 wt % of the photopolymerization initiator (C); about 1 to about 40 wt % of the black pigment including carbon black and a silver-tin-containing alloy (D); and balance of the solvent (E).

The organic binder resin may include a cardo-based binder resin and the cardo-based binder resin may be a compound including a repeating unit represented by the following Chemical Formula 1.

[Chemical Formula 1]

In Chemical Formula 1, $R_{24}$ to $R_{27}$ are the same or different and are independently hydrogen, halogen, or substituted or unsubstituted C1 to C20 alkyl,

$R_{28}$ and $R_{29}$ are the same or different and are independently hydrogen or $CH_2OR_a$, wherein $R_a$ is a vinyl group, an acrylic group, or a methacrylic group, $R_{30}$ is hydrogen, substituted or unsubstituted C1 to C20 alkyl, substituted or unsubstituted C2 to C20 alkenyl, acrylic group, or methacryl group,

$Z_1$ is a single bond, O, CO, $SO_2$, $CR_bR_c$, $SiR_dR_e$, wherein $R_b$ to $R_e$ are the same or different and are independently hydrogen or substituted or unsubstituted C1 to C20 alkyl, or one of functional groups represented by the following Chemical Formulae 2 to 12, $Z_2$ is an acid anhydride residual group or acid dianhydride residual group.

[Chemical Formula 2]

[Chemical Formula 3]

[Chemical Formula 4]

[Chemical Formula 5]

[Chemical Formula 6]

In Chemical Formula 6, $R_f$ is hydrogen, ethyl, $C_2H_4Cl$, $C_2H_4OH$, $CH_2CH=CH_2$, or phenyl.

[Chemical Formula 7]

[Chemical Formula 8]

[Chemical Formula 9]

[Chemical Formula 10]

[Chemical Formula 11]

[Chemical Formula 12]

The cardo-based binder resin may have a weight average molecular weight of about 1,000 to about 20,000 g/mol.

The black photosensitive resin composition may include the silver-tin-containing alloy in an amount of about 5 to about 60 wt % based on the solid total weight of the black photosensitive resin composition.

The black photosensitive resin composition may be used as a light blocking layer.

The present invention further provides a light blocking layer manufactured using the black photosensitive resin composition.

The light blocking layer may have an optical density of about 4.0 or more at a film thickness of about 0.7 μm or more.

Hereinafter, other embodiments will be described in detail.

The present invention may provide a black photosensitive resin composition having a high optical density without damaging the properties of a layer made using the same, excellent patterning properties and resolution, and a low dielectric constant. Accordingly, the black photosensitive resin composition may be useful in the production of a light blocking layer.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "substituted" refers to a halogen (F, Cl, Br or I), a hydroxyl group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C3 to C20 cycloalkyl group, a C3 to C20 cycloalkenyl group, a C2 to C20 heterocycloalkyl group, a C2 to C20 heterocycloalkenyl group, a C2 to C20°| heterocycloalkynyl group, or a combination thereof, replacing a corresponding number of hydrogen atoms.

As used herein, when a specific definition is not otherwise provided, "(meth)acrylate" refers to both "acrylate" and "methacrylate".

The photosensitive resin composition according to one embodiment includes (A) an organic binder resin, (B) a reactive unsaturated compound, (C) a photopolymerization initiator, (D) a black pigment including carbon black and a silver-tin-containing alloy, and (E) a solvent.

(A) Organic Binder Resin

The organic binder resin may include a cardo-based binder resin, an acrylic-based binder resin, a polyimide-based binder resin, a polyurethane-based binder resin, or a combination thereof. The cardo-based binder resin may improve heat resistance and chemical resistance of the black photosensitive resin composition.

The organic binder resin may have a weight average molecular weight of about 1,000 to about 150,000 g/mol.

The cardo-based binder resin may be a compound including a repeating unit represented by the following Chemical Formula 1.

[Chemical Formula 1]

In Chemical Formula 1,

$R_{24}$ to $R_{27}$ are the same or different and are independently hydrogen, halogen, or substituted or unsubstituted C1 to C20 alkyl, $R_{28}$ and $R_{29}$ are the same or different and are independently hydrogen or $CH_2OR_a$, wherein $R_a$ is a vinyl group, an acrylic group, or a methacryl group,

$R_{30}$ is hydrogen, substituted or unsubstituted C1 to C20 alkyl, substituted or unsubstituted C2 to C20 alkenyl group, an acrylic group, or a methacryl group, $Z_1$ is a single bond, O, CO, $SO_2$, $CR_bR_c$, $SiR_dR_e$, wherein $R_b$ to $R_e$ are the same or different and are independently hydrogen or substituted or unsubstituted C1 to C20 alkyl, or one of functional groups represented by the following Chemical Formulae 2 to 12, and

$Z_2$ is an acid anhydride residual group or acid dianhydride residual group.

[Chemical Formula 2]

[Chemical Formula 3]

[Chemical Formula 4]

[Chemical Formula 5]

[Chemical Formula 6]

In Chemical Formula 6, $R_f$ is hydrogen, ethyl, $C_2H_4Cl$, $C_2H_4OH$, $CH_2CH=CH_2$, or phenyl.

[Chemical Formula 7]

[Chemical Formula 8]

[Chemical Formula 9]

[Chemical Formula 10]

[Chemical Formula 11]

[Chemical Formula 12]

The cardo-based binder resin may be obtained by reacting the compound represented by the following Chemical Formula 13 with tetracarboxylic acid dianhydride.

[Chemical Formula 13]

The tetracarboxylic acid dianhydride may be an aromatic tetracarboxylic acid dianhydride. Examples of the aromatic tetracarboxylic acid dianhydride include without limitation pyromellitic dianhydride, 3,3',4,4'-biphenyltetracarboxylic acid dianhydride, 2,3,3',4-biphenyltetracarboxylic acid dianhydride, 2,2',3,3'-biphenyltetracarboxylic acid dianhydride, 3,3',4,4'-benzophenonetetracarboxylic acid dianhydride, 3,3',4,4'-biphenylethertetracarboxylic acid dianhydride, 3,3', 4,4'-diphenylsulfonetetracarboxylic acid dianhydride, 1,2,3, 4-cyclopentanetetracarboxylic acid dianhydride, 1,2,5,6-naphthalenetetracarboxylic acid dianhydride, 2,3,6,7-naphthalenetetracarboxylic acid dianhydride, 1,4,5,8- naphthalenetetracarboxylic acid dianhydride, 2,3,5,6-pyridinetetracarboxylic acid dianhydride, 3,4,9,10-perylenetetracarboxylic acid dianhydride, 2,2-bis (3,4-dicarboxylphenyl)hexafluoropropane dianhydride, and the like, and combinations thereof.

The cardo-based binder resin may have a weight average molecular weight of about 1,000 to about 20,000 g/mol, for example about 3,000 to about 10,000 g/mol. When the cardo-based binder resin has a weight average molecular weight within the above range, the resulting light blocking layer can have excellent patterning properties and development properties.

The acrylic-based binder resin is a copolymer of a first ethylenic unsaturated monomer and a second ethylenic unsaturated monomer that is copolymerizable with the first ethylenic unsaturated monomer, and a resin including at least one acrylic-based repeating unit.

The first ethylenic unsaturated monomer is an ethylenic unsaturated monomer including at least one carboxyl group. Examples of the first ethylenic unsaturated monomer include without limitation acrylic acid, (meth)acrylic acid, maleic acid, itaconic acid, fumaric acid, and the like, and combinations thereof.

The acrylic-based binder resin may include the first ethylenic unsaturated monomer in an amount ranging from about 5 to about 50 wt %, for example about 10 to about 40 wt %, based on the total weight of the acrylic-based binder resin. In some embodiments, the acrylic-based binder resin may include the first ethylenic unsaturated monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt. %. Further, according to some embodiments of the present invention, the amount of the first ethylenic unsaturated monomer can be in a range from about any of the foregoing amounts to about any other of the foregoing amounts.

Examples of the second ethylenic unsaturated monomer may include without limitation aromatic vinyl compounds such as styrene, α-methylstyrene, vinyltoluene, vinylbenzylmethylether, and the like; unsaturated carboxylic acid ester compounds such as methyl(meth)acrylate, ethyl(meth)acrylate, butyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, and the like; unsaturated carboxylic acid aminoalkyl ester compounds such as 2-aminoethyl(meth)acrylate, 2-dimethylaminoethyl (meth)acrylate, and the like; carboxylic acid vinyl ester compounds such as vinyl acetate, vinyl benzoate, and the like; unsaturated carboxylic acid glycidyl ester compounds such as glycidyl(meth)acrylate, and the like; vinyl cyanide compounds such as (meth)acrylonitrile and the like; unsaturated amide compounds such as (meth)acrylamide, and the like; and the like. They may be used singularly or as a mixture of more than two.

The acrylic-based resin may include the second ethylenic unsaturated monomer in an amount ranging from about 50 to about 95 wt %, for example about 90 to about 60 wt %, based on the total weight of the acrylic-based resin. In some embodiments, the acrylic-based resin may include the second ethylenic unsaturated monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86 ,87, 88, 89, 90, 91, 92, 93, 94, or 95 wt %. Further, according to some embodiments of the present invention, the amount of the second ethylenic unsaturated monomer can be in a range from about any of the foregoing amounts to about any other of the foregoing amounts.

Examples of the acrylic-based binder resin may include without limitation a methacrylic acid/benzylmethacrylate copolymer, a methacrylic acid/benzylmethacrylate/styrene copolymer, a methacrylic acid/benzylmethacrylate/2-hydroxyethylmethacrylate copolymer, a methacrylic acid/benzyl methacrylate/styrene/2-hydroxyethylmethacrylate copolymer, and the like. They may be used singularly or as a mixture of two or more.

The acrylic-based binder resin may have a weight average molecular weight ranging from about 3,000 to about 150,000 g/mol, for example about 5,000 to about 50,000 g/mol, and as another example about 2,000 to about 30,000 g/mol. When the acrylic-based binder resin has a weight average molecular weight within these ranges, the photosensitive resin composition can have good physical and chemical properties, appropriate viscosity, and/or close contacting (adhesive) properties with a substrate when used as a light blocking layer.

The acrylic-based binder resin may have an acid value ranging from about 15 to about 60 mgKOH/g, for example about 20 to about 50 mgKOH/g. When acrylic-based binder resin has an acid value within these ranges, excellent pixel resolution may be realized.

The black photosensitive resin composition may include the organic binder resin in an amount of about 0.5 to about 20 wt %, for example about 1 to about 10 wt %, based on the total weight of the black photosensitive resin composition. In some embodiments, the black photosensitive resin composition may include the organic binder resin in an amount of about 0.5, 0.6, 0.7, 0.8, 0.9, 1, 2, 3, 4, 5, 6, 7, 8, 9, 10, 11, 12, 13, 14, 15, 16, 17, 18, 19, or 20 wt %. Further, according to some embodiments of the present invention, the amount of the organic binder resin can be in a range from about any of the foregoing amounts to about any other of the foregoing amounts.

When the organic binder resin is included in an amount within these ranges, the composition may have a viscosity appropriate to provide a light blocking layer having patterning properties, processibility, and/or development properties.

(B) Reactive Unsaturated Compound

The reactive unsaturated compound may be any conventional monomer or oligomer known in the art for use in a photosensitive resin composition. Exemplary reactive unsaturated compounds include without limitation mono-functional and/or multi-functional ester(s) of (meth)acrylic acid including at least one ethylenic unsaturated double bond.

Examples of the reactive unsaturated compound include without limitation ethylene glycol diacrylate, ethylene glycol dimethacrylate, diethylene glycol diacrylate, triethylene glycol diacrylate, triethylene glycol dimethacrylate, 1,6-hexanediol diacrylate, 1,6-hexanediol dimethacrylate, pentaerythritol triacrylate, pentaerythritol tetraacrylate, dipentaerythritol pentaacrylate, dipentaerythritol hexaacrylate, bisphenol A epoxyacrylate, ethylene glycol monomethylether acrylate, trimethylolpropane triacrylate, trisacryloyloxyethyl phosphate, and the like, and combinations thereof.

Examples of commercially available reactive unsaturated compounds include without limitation the following compounds. Examples of mono-functional (meth)acrylic acid esters may include without limitation Aronix M-101®, M-111®, M-114® (TOAGOSEI CHEMICAL INDUSTRY CO., LTD.); KAYARAD TC-110S®, TC-120S® (NIPPON KAYAKU CO., LTD.); V-158®, V-2311® (OSAKA ORGANIC CHEMICAL IND., LTD.), and the like. Examples of difunctional (meth)acrylic acid esters may include without limitation Aronix M-210®, M-240®, M-6200® (TOAGOSEI CHEMICAL INDUSTRY CO., LTD.), KAYARAD HDDA®, HX-220®, R-604® (NIPPON KAYAKU CO., LTD.), V-260®, V-312®, V-335 HP® (OSAKA ORGANIC CHEMICAL IND., LTD.), and the like. Examples of tri-functional (meth)acrylic acid esters may include without limitation Aronix M-309®, M-400®, M-405®, M-450®, M-7100®, M-8030®, M-8060® (TOA-GOSEI CHEMICAL INDUSTRY CO., LTD.), KAYARAD TMPTA®, DPCA-20®, DPCA-30®, DPCA-60®, DPCA-120® (NIPPON KAYAKU CO., LTD.), V-295®, V-300®, V-360®, V-GPT®, V-3PA®, V-400® (OSAKA YUKI KAYAKU KOGYO CO., LTD.), and the like. The reactive unsaturated compounds may be used singularly or as a mixture of two or more.

The black photosensitive resin composition may include the reactive unsaturated compound in an amount ranging from about 1 to about 20 wt %, for example about 1 to about 15 wt %, based on the total weight of the black photosensitive resin composition. In some embodiments, the black photosensitive resin composition may include the reactive unsaturated compound in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the reactive unsaturated compound can be in a range from about any of the foregoing amounts to about any other of the foregoing amounts.

When the reactive unsaturated compound is included in an amount within these ranges, compatibility with the organic binder resin can be improved and thus a film having excellent patterning properties and sensitivity under oxygen, and having a smooth surface during manufacture of a light blocking layer, can be provided.

(C) Photopolymerization Initiator

The photopolymerization initiator may be any conventional initiator useful in a photosensitive resin composition. Non-limiting examples of photopolymerization initiators include acetophenone-based compounds, benzophenone-based compounds, thioxanthone-based compounds, benzoin-based compound, a triazine-based compounds, and the like, and combinations thereof.

Exemplary acetophenone-based compounds include without limitation 2,2'-diethoxy acetophenone, 2,2'-dibutoxy acetophenone, 2-hydroxy-2-methylpropinophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1- (4-morpholinophenyl)-butan-1-one, and the like, and combinations thereof.

Exemplary benzophenone-based compounds include without limitation benzophenone, benzoyl benzoate, benzoyl methyl benzoate, 4-phenyl benzophenone, hydroxy benzophenone, acrylated benzophenone, 4,4'-bis(dimethyl amino)benzophenone, 4,4'-bis(diethylamino)benzophenone, 4,4'-dimethylaminobenzophenone,4,4'-dichlorobenzophenone, 3,3'-dimethyl-2-methoxybenzophenone, and the like, and combinations thereof.

Exemplary thioxanthone-based compounds include without limitation thioxanthone, 2-methylthioxanthone, isopropyl thioxanthone, 2,4-diethyl thioxanthone, 2,4-diisopropyl thioxanthone, 2-chlorothioxanthone, and the like, and combinations thereof.

Exemplary benzoin-based compounds include without limitation benzoin, benzoin methyl ether, benzoin ethyl ether, benzoin isopropyl ether, benzoin isobutyl ether, benzyldimethylketal, and the like, and combinations, thereof.

Exemplary triazine-based compounds include without limitation 2,4,6-trichloro-s-triazine, 2-phenyl 4,6-bis(trichloromethyl)-s-triazine, 2-(3',4'-dimethoxystyryl)-4,6-bis (trichloromethyl)-s-triazine 2-(4'-methoxynaphthyl)-4,6-bis (trichloromethyl)-s-triazine, 2-(p-methoxyphenyl)-4,6-bis (trichloromethyl)-s-triazine, 2-(p-tolyl)-4,6-bis(trichloro methyl)-s-triazine, 2-biphenyl 4,6-bis(trichloro methyl)-s-triazine, bis(trichloromethyl)-6-styryl-s-triazine, 2-(naphto-1-yl)-4,6-bis(trichloromethyl)-s-triazine, 2-(4-methoxynaphto-1-yl)-4,6-bis(trichloromethyl)-s-triazine, 2-4-trichloromethyl(piperonyl)-6-triazine, 2-4-trichloromethyl (4'-methoxystyryl)-6-triazine, and the like, and combinations thereof.

The photopolymerization initiator may further include a carbazole-based compound, a diketone-based compound, a sulfonium borate-based compound, a diazo-based compound, a biimidazole-based compound, and the like, and combinations thereof.

Since the photopolymerization initiator absorbs light and is excited and then transmits energy, it may be used with a photo-sensitizer causing a chemical reaction. Exemplary photo-sensitizers include without limitation tetraethylene glycol bis-3-mercapto propionate, pentaerythritol tetrakis-3-mercapto propionate, dipentaerythritol tetrakis-3-mercapto propionate, and the like, and combinations thereof.

The black photosensitive resin composition may include the photopolymerization initiator in an amount of about 0.1 wt % to about 10 wt %, for example about 1 to about 5 wt %, based on the total weight of the black photosensitive resin composition. In some embodiments, the black photosensitive resin composition may include the photopolymerization initiator in an amount of about 0.1, 0.2, 0.3, 0.4, 0.5, 0.6, 0.7, 0.8, 0.9, 1, 2, 3, 4, 5, 6, 7, 8, 9, or 10 wt %. Further, according to some embodiments of the present invention, the amount of the photopolymerization initiator can be in a range from about any of the foregoing amounts to about any other of the foregoing amounts.

When the photopolymerization initiator is included in an amount within these ranges, radical sensitivity can be good, a black photosensitive resin composition solution can have a desirable color concentration, and transmittance reduction due to non-reacted initiators may be inhibited.

(D) Black Pigment

The black pigment may be a mixed pigment of carbon black and a silver-tin-containing alloy.

The carbon black is not particularly limited. Exemplary carbon black includes without limitation graphitized carbon, furnace black, acetylene black, ketjen black, and the like, and combinations thereof.

The silver-tin-containing alloy may include silver (Ag) and tin (Sn) as a main component and have an average particle size ranging from about 1 to about 300 nm, for example about 1 to about 10 nm. When the silver-tin-containing alloy has an average particle size within these ranges, it may prevent fine impurities from being generated on a substrate during the pattern formation process.

The silver-tin-containing alloy may be a black pigment. The silver and tin may be present in the silver-tin-containing alloy in a weight ratio ranging from about 6:4 to about 8:2, for example a weight ratio ranging from about 7:3 to about 7.5:2.5.

In some embodiments, the silver-tin-containing alloy may include silver in an amount of about 60, 61, 62, 63, 64, 65, 66, 67, 68, 69, 70, 71, 72, 73, 74, 75, 76, 77, 78, 79, or 80 wt %. Further, according to some embodiments of the present invention, the amount of silver can be in a range from about any of the foregoing amounts to about any other of the foregoing amounts.

In some embodiments, the silver-tin-containing alloy may include tin in an amount of about 20, 21, 22, 23, 24, 25, 26, 27, 28, 29, 30, 31, 32, 33, 34, 35, 36, 37, 38, 39, or 40 wt %. Further, according to some embodiments of the present invention, the amount of silver can be in a range from about any of the foregoing amounts to about any other of the foregoing amounts.

When the silver-tin-containing alloy includes silver and tin in a weight ratio within these ranges, a light blocking layer may have a higher optical density, excellent light-blocking properties, and/or appropriate conductivity, thus may allow easy control of dielectric constant.

The silver-tin-containing alloy may be coated to have an insulation layer on the surface. The coating on the silver-tin-containing alloy may include a silica-based compound. The coated silver-tin-containing alloy may be easily dispersed in a solvent and provide optical density to a light blocking layer.

The carbon black and the silver-tin-containing alloy may be mixed in a weight ratio ranging from about 1:9 to about 9:1, for example about 1:1 to about 1:8.

In some embodiments, the carbon black may be present in the mixture of carbon black and silver-tin-containing alloy in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86 ,87, 88, 89, or 90 wt. %. Further, according to some embodiments of the present invention, the amount of carbon black can be in a range from about any of the foregoing amounts to about any other of the foregoing amounts.

In some embodiments, the silver-tin-containing alloy may be present in the mixture of carbon black and silver-tin-containing alloy in an amount of about 10; 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86 ,87, 88, 89, or 90 wt. %. Further, according to some embodiments of the present invention, the amount of silver-tin-containing alloy can be in a range from about any of the foregoing amounts to about any other of the foregoing amounts.

When carbon black and the silver-tin-containing alloy are used in an amount within these ratios, they may provide high optical density and/or excellent processibility such as patterning properties, resolution, and the like.

The black photosensitive resin composition may include the silver-tin-containing alloy in an amount of about 5 to about 60 wt %, for example about 30 to about 60 wt %, based on the total weight of solids of the black photosensitive resin composition. In some embodiments, the black photosensitive resin composition may include the silver-tin-containing alloy in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt. %. Further, according to some embodiments of the present invention, the amount of silver-tin-containing alloy can be in a range from about any of the foregoing amounts to about any other of the foregoing amounts.

When silver-tin-containing alloy is included in an amount within these ranges, it may provide high optical density without damaging processibility properties, such as development margins, exposure margins, resolution, and the like during preparion of a light blocking layer.

The black photosensitive resin composition may further include a dispersing agent in order to improve dispersion of the black pigment. For example, the black pigment may be surface-pretreated with a dispersing agent, or the black pigment and a dispersing agent, and optionally solvent, may be mixed together to prepare a black pigment dispersion solution.

In an exemplary embodiment of the invention, the silver-tin-containing alloy can be mixed with a dispersing agent, a solvent, and the like to prepare a first pigment dispersion solution, and the carbon black can be mixed with a dispersing agent, a solvent, and the like to prepare a second pigment dispersion solution. Then, the first and second pigment dispersion solutions can be mixed together and used for the black photosensitive resin composition. In an alternative embodiment, the silver-tin-containing alloy and the carbon black can be mixed together with a dispersing agent, a solvent, and the like to prepare a pigment dispersion solution including both the silver-tin-containing alloy and carbon black. This alternative pigment dispersion solution may also be used for the black photosensitive resin composition.

The dispersing agent may help the black pigment to be uniformly dispersed in the solvent.

Examples of the dispersing agent may include without limitation non-ionic compounds, anionic compounds, cationic compounds, and the like, and combinations thereof. Examples of the dispersing agent include without limitation polyalkylene glycol and esters thereof, polyoxyalkylene, polyhydric alcohol ester alkylene oxide addition products, alcohol alkylene oxide addition products, sulfonic acid esters, sulfonate, carboxylic acid esters, carboxylates, alkylamide alkylene oxide addition products, alkylamines, and the like, and combinations thereof.

Commercially available examples of the dispersing agent include without limitation: DISPERBYK-101, DISPERBYK-130, DISPERBYK-140, DISPERBYK-160, DISPERBYK-161, DISPERBYK-162, DISPERBYK-163, DISPERBYK-164, DISPERBYK-165, DISPERBYK-166, DISPERBYK-170, DISPERBYK-171, DISPERBYK-182, DISPERBYK-2000, DISPERBYK-2001, and the like (BYK); EFKA-47, EFKA-47EA, EFKA-48, EFKA-49, EFKA-100, EFKA-400, EFKA-450, and the like (EFKA chemicals); Solsperse 5000, Solsperse 12000, Solsperse 13240, Solsperse 13940, Solsperse 17000, Solsperse 20000, Solsperse 24000GR, Solsperse 27000, Solsperse 28000, and the like (Zeneka); or PB711, PB821, and the like (Ajinomoto); and combinations thereof.

The black photosensitive resin composition may include the dispersing agent in an amount of about 0.01 to about 15 wt %, based on the total weight of the black photosensitive resin composition. In some embodiments, the black photosensitive resin composition may include the dispersing agent in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt %. Further, according to some embodiments of the present invention, the amount of the dispersing agent can be in a range from about any of the foregoing amounts to about any other of the foregoing amounts.

When the dispersing agent is included in an amount in the above ranges, dispersion of the black photosensitive resin composition can improve, which can provide excellent stability, development properties, and/or patterning properties during manufacture of a light blocking layer.

The solvent is described as below.

The black photosensitive resin composition may include the black pigment in an amount of about 1 to about 40 wt %, for example about 5 to about 30 wt %, based on the total weight of the black photosensitive resin composition. In some embodiments, the black photosensitive resin composition may include the black pigment in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt. %. Further, according to some embodiments of the present invention, the amount of black pigment can be in a range from about any of the foregoing amounts to about any other of the foregoing amounts.

When the black pigment is included in an amount within the above ranges, a light blocking layer having excellent insulation properties, a high optical density, and/or excellent development properties and processibility may be provided.

(E) Solvent

The solvent is compatible with the organic binder resin, reactive unsaturated compound, photopolymerization initiator, and black pigment, but is not reactive therewith.

Examples of the solvent may include without limitation alcohols such as methanol, ethanol, and the like; ethers such as dichloroethyl ether, n-butyl ether, diisoamyl ether, methylphenyl ether, tetrahydrofuran, and the like; glycol ethers such as ethylene glycol monomethylether, ethylene glycol monoethylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol methylether acetate, propylene glycol propylether acetate, and the like; aromatic hydrocarbons such as toluene, xylene, and the like; ketones such as methylethylketone, cyclohexahone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactic acid alkyl esters such as methyl lactate, ethyl lactate, and the like; hydroxyacetic acid alkyl esters such as methyl hydroxyacetate, ethyl hydroxyacetate, butyl hydroxyacetate, and the like; acetic acid alkoxyalkyl esters such as methoxymethyl acetate, methoxyethyl acetate, methoxybutyl acetate, ethoxymethyl acetate, ethoxyethyl acetate, and the like; 3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl esters such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-oxy-2-methylpropionic acid alkyl esters such as methyl 2-hydroxy-2-methyl propionate, ethyl 2-hydroxy-2-methylpropionate, and the like; 2-alkoxy-2-methylpropionic acid alkyl esters such as methyl 2-methoxy-2-methylpropionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate; ketonic acid esters such as ethyl pyruvate; and the like, and combinations thereof. Furthermore, the solvent may be N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetyl acetone, isophorone, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate, phenyl cellosolve acetate, and the like. These solvents may be used singularly or in a combination.

In various embodiments, taking into account miscibility and reactivity, exemplary solvents can include without limitation glycol ethers such as ethylene glycol monoethylether, and the like; ethylene glycol alkylether acetates such as ethyl cellosolve acetate, and the like; esters such as 2-hydroxy ethyl propionate, and the like; carbitols such as diethylene glycol monomethylether, and the like; propylene glycol alkylether acetates such as propylene glycol methylether acetate, propylene glycol propylether acetate, and the like, and combinations thereof.

The solvent is used as a balance amount, for example about 50 to about 70 wt %, based on the total weight of the black photosensitive resin composition. In some embodiments, the solvent can used in an amount of about 50, 51, 52, 53, 54, 55, 56, 57, 58, 59, 60, 61, 62, 63, 64, 65, 66, 67, 68, 69, or 70 wt %. Further, according to some embodiments of the present invention, the amount of solvent can be in a range from about any of the foregoing amounts to about any other of the foregoing amounts.

When the solvent is included in an amount within these ranges, the black photosensitive resin composition may have an appropriate viscosity which can improve processibiity of a light blocking layer.

(F) Other Additive(s)

The black photosensitive resin composition may further include a silane coupling agent having a reactive substituent such as a carboxyl group, a methacryloyl group, an isocyanate group, an epoxy group, and the like in order to improve adherence to a substrate.

Examples of the silane coupling agent include without limitation trimethoxysilyl benzoic acid, γ-methacryl oxypropyl trimethoxysilane, vinyl triacetoxysilane, vinyl trimethoxysilane, γ-iso cyanate propyl triethoxysilane, γ-glycidoxy propyl trimethoxysilane, β-(3,4-epoxycyclohexyl)ethyltrimethoxysilane, and the like. The silane coupling agent may be used singularly or as a mixture of two or more. The black photosensitive resin composition may include the silane coupling agent in an amount of about 0.001 to about 5 parts by weight, based on 100 parts by weight of the organic binder resin. In some embodiments, the black photosensitive resin composition may include the silane coupling agent in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight. Further, according to some embodiments of the present invention, the amount of the silane coupling agent can be in a range from about any of the foregoing amounts to about any other of the foregoing amounts.

The black photosensitive resin composition may further include a surfactant in order to improve coating properties and prevent spots.

Examples of the surfactant may include without limitation fluorine-based surfactants, for example, BM-1000®, and BM-1100® (BM Chemie Inc.); MEGAFACE F 142D®, F 172®, F 173®, and F 183® DAINIPPON INK KAGAKU KOGYO CO., LTD.); FULORAD FC-135®, FULORAD FC-170C®, FULORAD FC-430®, and FULORAD FC-431® (SUMITOMO 3M CO., LTD.); SURFLON S-112®, SURFLON S-113®, SURFLON S-131®, SURFLON S-141®, and SURFLON S-145® (ASAHI GLASS CO., LTD.); and SH-28PA®, SH-190®, SH-193®, SZ-6032®, and SF-8428® (TORAY SILICONE CO., LTD.), and the like, and combinations thereof.

The black photosensitive resin composition may include the surfactant in an amount of about 0.001 to about 5 parts by weight, based on 100 parts by weight of the organic binder resin. In some embodiments, the black photosensitive resin composition may include the surfactant in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4. 0.5, 0.6, 0.7, 0.8, 0.9, 1, 2, 3, 4, or 5 parts by weight. Further, according to some embodiments of the present invention, the amount of the surfactant can be in a range from about any of the foregoing amounts to about any other of the foregoing amounts.

When the surfactant is included in an amount within these ranges, coating uniformity may be ensured, stains may not be generated, and wetting properties for a glass substrate can be improved.

The black photosensitive resin composition may further include other additives such as but not limited to antioxidants, stabilizers, and the like. The other additives can be used in conventional amounts so long as they do not adversely affect the desired properties of the photosensitive resin composition.

According to another embodiment, a light blocking layer manufactured using the photosensitive resin composition is provided. The light blocking layer may be manufactured as follows.

(1) Application and Film Formation

The aforementioned black photosensitive resin composition can be coated to have a desired thickness, for example, ranging from about 0.9 to about 1.5 μm on a pre-treated substrate using a spin or slit coating method, a roll coating method, a screen printing method, an applicator method, and the like. Then, the coated substrate can be heated at a temperature ranging from about 70 to about 90° C. for about 1 to about 10 minutes to remove a solvent.

The film can have an optical density of more than about 4.0 at a thickness of about 0.7 μm. Higher optical densities are better. When the black photosensitive resin composition has an optical density within this range, light from the bottom may not escape.

(2) Exposure

A mask is disposed on the prepared film to form a pattern. The film with the mask is exposed to radiation having an active wavelength ranging from about 200 to about 500nm. The radiation exposure can be is performed using a light source such as a low pressure mercury lamp, a high pressure mercury lamp, an ultra high pressure mercury lamp, a metal halide lamp, an argon gas laser, and the like. However, other sources of radiation may be used, such as but not limited to X rays, electron beams, and the like.

An exemplary exposure step may use a light dose of about 500 mJ/cm² or less (by a 365 nm sensor) with a high pressure mercury lamp. The light does may vary, however, depending on the types and amounts of components of the black photosensitive resin composition, thickness of a dry layer, and the like. The light dose can be readily determined by the skilled artisan without undue experimentation.

(3) Development

The exposed film can be developed with an alkali aqueous solution to dissolve and remove non-exposed parts so that the exposed parts remain to form an image pattern.

(4) Post Process Treatment

The prepared image pattern may be cured, for example by heating or exposing to radiation to provide a film that can have excellent heat resistance, photo resistance, close contacting (adhesive) property, crack resistance, chemical resistance, high strength, and/or storage stability, among other properties.

The aforementioned black photosensitive resin composition may provide excellent insulation properties and an optical density required for a light blocking layer.

Hereinafter, the present invention is illustrated in more detail with reference to examples. However, these are exemplary embodiments of present invention and are not limiting.

EXAMPLES 1 To 4 AND COMPARATIVE EXAMPLES 1 To 5

Each black photosensitive resin composition according to Examples 1 to 4 and Comparative Examples 1 to 5 is prepared to have a composition provided in Table 1 using the following components.

(A) Organic Binder Resin (A-1) 159 g of 3,3-bis(4-hydroxyphenyl)-2-benzofuran-1-on, 426.6 g of epichlorohydrin, and 160 g of a 50% alkali aqueous solution are mixed in a 1 L flask and then reacted together at 95° C. for 1 hour to form a bisphenylbenzofuran-type epoxy resin. 215 g of the bisphenylbenzofuran-type epoxy resin is mixed with 450 mg of triethylbenzylammoniumchloride, 100 mg of 2,6-diisobutylphenol, and 72 g of acrylic acid. The mixture is heated and completely dissolved at a temperature ranging from 90 to 120° C., while air is blown therein at a speed of 25 Ml per minute.

Then, the resulting product is cooled down to room temperature to form a non-colored transparent solid bisphenyl-benzofuran-type epoxy acrylate. 287 g of the synthesized bisphenylbenzofuran-type epoxy acrylate is dissolved in 2 kg of cellosolveacetate. Then, 38 g of 1,2,3,6-tetrahydrophthacid anhydride, 80.5 g of benzophenonetetracarboxylic acid dianhydride, and 1 g of tetraethylammonium bromide are added to the solution. The mixture is slowly heated for reaction up to 110 to 115° C. for 2 hours to form a cardo-based binder resin with a weight average molecular weight of 5,000 g/mol.

(A-2) 159 g of 3,3-bis (4-hydroxyphenyl)-2-benzofuran-1-on, 426.6 g of epichlorohydrin, and 160 g of a 50% alkali aqueous solution are mixed in a 1 L flask and reacted together at 95° C. for 1 hour to form a bisphenylbenzofuran-type epoxy resin. 215 g of the bisphenylbenzofuran-type epoxy resin is mixed with 450 mg of triethylbenzylammoniumchloride, 100 mg of 2,6-diisobutylphenol, and 72 g of acrylic acid. The mixture is heated up to 90 to 120° C. and completely dissolved, while air is blown therein at a speed of 25 Ml. Then, the dissolved product is cooled down to room temperature to form a non-colored transparent solid bisphenylbenzofuran-type epoxy acrylate. 287 g of the synthesized bisphenylbenzofuran-type epoxy acrylate is dissolved in 2 kg of cellosolveacetate. The solution is mixed with 10 g of 1,2,3,6-tetrahydrophthacid anhydride, 108.5 g of benzophenonetetracarboxylic acid dianhydride, and 1 g of tetraethylammonium bromide. The mixture is slowly heated up to 110 to 115° C. for 2 hours to form a cardo-based binder resin with a weight average molecular weight of 30,000 g/mol.

(B) Reactive Unsaturated Compound

Dipentaerythritol hexaacrylate is used.

(C) Photopolymerization Initiator

IGR 369 made by Ciba-Geigy Co. is used.

(D) Black Pigment Dispersion (D-1) A pigment dispersion solution including a silver-tin alloy (TMP-DC-1, pigment solid=30%, a weight ratio between silver and tin=7:3, Sumitomo Osaka Cement Co., Ltd.) is used.

(D-2) A pigment dispersion solution including carbon black (Cl-M-050, Sakata Co.) is used.

(E) Solvent

Propylene glycol methylether acetate is used.

(F) Other Additive

γ-glycidoxy propyl trimethoxysilane (S-510, Chisso Co.) is used as a silane coupling agent.

Evaluation 3—Resolution Measurement

The minimum pattern (size) of each pattern acquired in the evaluation 2 according to Examples 1 to 4 and Comparative Examples 1 to 5 is determined with an optical microscope. The results are provided in the following Table 2. The resolution measurements in the following Table 2 indicate the pattern size of a mask used during the exposure and are measured using VK-8550 made by KEYENCE Co.

Evaluation 4—Dielectric constant Measurement

The black photosensitive resin compositions according to Examples 1 to 4 and Comparative Examples 1 to 5, respectively, are used to prepare a light blocking layer. An ITO

TABLE 1

|  |  | Example | | | | Comparative Example | | | | |
|---|---|---|---|---|---|---|---|---|---|---|
|  |  | 1 | 2 | 3 | 4 | 1 | 2 | 3 | 4 | 5 |
| (A) Organic binder resin (g) | (A-1, g) | 2 | 2 | 2 | 2 | 2 | 2 | — | 2 | 2 |
|  | (A-2, g) | — | — | — | — | — | — | 2 | — | — |
| (B) Reactive unsaturated compound (g) |  | 1 | 1 | 1 | 1 | 1 | 1 | 1 | 1 | 1 |
| (C) Photopolymerization initiator (g) |  | 0.5 | 0.5 | 0.5 | 0.5 | 0.5 | 0.5 | 0.5 | 0.5 | 0.5 |
| (D) Black pigment dispersion | (D-1, g) | 40 (58.8*) | 32.5 (53.5*) | 30 49* | 25 41* | — | 45 (74.1*) | 40 (58.8*) | 40 (58.8*) | 35 (57.6*) |
|  | (D-2, g) | 5 | 12.5 | 15 | 20 | 45 | — | — | — | — |
| (E) Solvent (g) |  | 51.495 | 51.495 | 51.495 | 51.495 | 51.495 | 51.495 | 56.495 | 56.495 | 62.495 |
| (F) Other additive |  | 0.005 | 0.005 | 0.005 | 0.005 | 0.005 | 0.005 | 0.005 | 0.005 | 0.005 |

The mark * indicates the solid amount of a silver-tin alloy based on the total solid amount of (A), (B), (C), (D), (E), and (F).

Evaluation 1 —Optical Density

The black photosensitive resin compositions according to Examples 1 to 4 and Comparative Examples 1 to 5, respectively, are coated on a 0.7 mm-thick glass substrate and then dried on a 90° C. hot plate for 2.5 minutes to fabricate a 0.7 μm-thick film. The film is cooled down to room temperature and dried in a 230° C. forced convention drying oven for 30 minutes. Then, the optical density of each film is measured using a 310TR optical densitometer (X-lite Co.). The results are provided in the following Table 2.

<Evaluation Reference>

○: optical density of more than 4

Δ: optical density ranging from 2.5 to 4.0 x: optical density of less than 2.5

Evaluation 2—Pattern-forming Property Measurment

Each film acquired in the evaluation 1 according to Examples 1 to 4 and Comparative Examples 1 to 5 is covered with a pattern mask and exposed to radiation having a wavelength of 365 nm with 40 mJ/cm². The resulting product is developed with an aqueous solution diluted by 1 wt % potassium hydroxide at 23° C. for 1 minute and then cleaned with pure water for 1 minute. The acquired pattern is heated and cured in a 220° C. oven for 30 minutes and then examined using an optical microscope. The results are provided in the following Table 2 and FIGS. 1 and 2.

Figure 1:
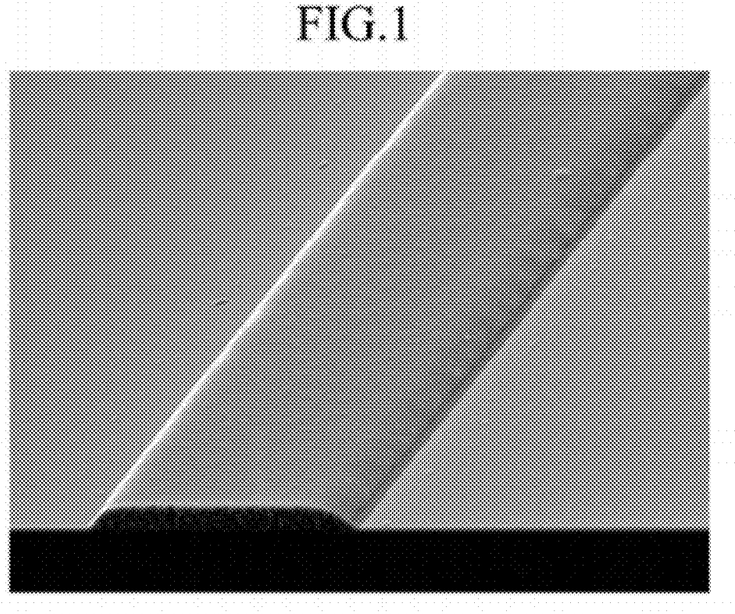
FIG. 1 is a scanning electron microscope (SEM) photograph showing residue of the film pattern according to Example 1.
Figure 2:
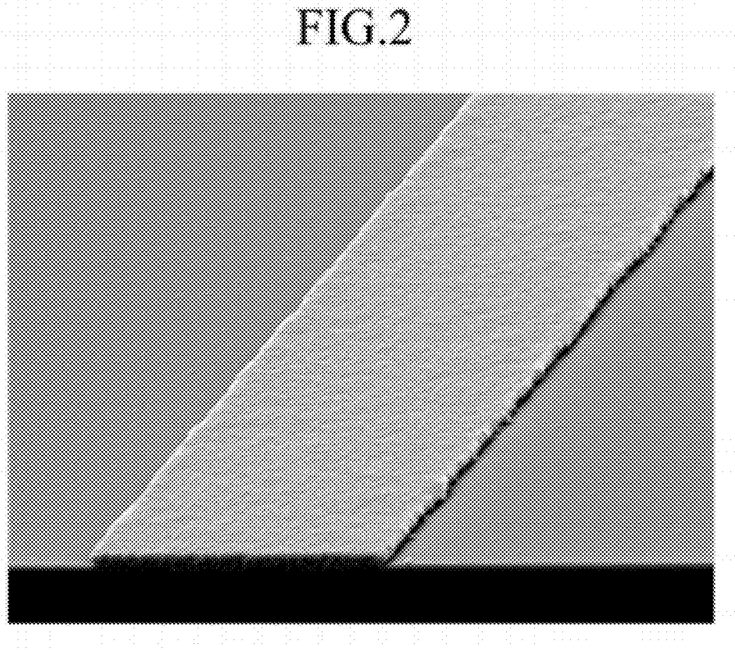
FIG. 2 is a scanning electron microscope (SEM) photograph showing residue of the film pattern according to Comparative Example 1.

FIG. 1 is a scanning electron microscope (SEM) photograph showing the pattern of a film according to Example 1. FIG. 2 is a scanning electron microscope (SEM) photograph showing the pattern of a film according to Comparative Example 1.

<Evaluation Reference>

○: good formation of 10 μm pattern

Δ: bad formation of 10 μm pattern x: no formation of 10 μm pattern (indium tin oxide) glass is used as a lower substrate. A light blocking layer is applied to the lower substrate to partially cover the same and to expose the ITO in the remaining, non-covered parts of the lower substrate. Next, a gold (Au) electrode is sputtered on the prepared specimen. Capacitance of the resulting product is measured using a LCR Meter device to calculate its dielectric constant. The results are provided in the following Table 2.

TABLE 2

|  | Optical density | Pattern-forming property | Resolution (μm) | Dielectric constant |
|---|---|---|---|---|
| Example 1 | ○ | ○ | 8 | 20 |
| Example 2 | ○ | ○ | 8 | 23 |
| Example 3 | ○ | ○ | 8 | 29 |
| Example 4 | ○ | ○ | 8 | 35 |
| Comparative Example 1 | ○ | x | 25 | 50 or more |
| Comparative Example 2 | Δ | x | 8 | 17 |
| Comparative Example 3 | Δ | x | 30 | 17 |
| Comparative Example 4 | Δ | x | 7 | 17 |
| Comparative Example 5 | Δ | x | 7 | 17 |

Referring to Table 2, the black photosensitive resin compositions of Examples 1' to 4 including an organic binder resin, a reactive unsaturated compound, a photopolymerization initiator, a black pigment including carbon black and a silver-tin-containing alloy, and a solvent exhibit excellent resolution or excellent pattern-forming property and optical density compared with the compositions of Comparative Examples 1 to 5 including either carbon black or a silver-tin-containing alloy in the black pigment.

For example, the black photosensitive resin composition of Comparative Example 1 including only carbon black exhibits deteriorated pattern-forming property, resolution, and dielectric constant compared with the compositions of Examples 1 to 4. The black photosensitive resin compositions of Comparative Examples 2 to 5 including only a silver-tin-containing alloy exhibit very deteriorated pattern-forming property. In addition, referring to FIGS. 1 and 2, the film of Example 1 has a better pattern than the film of Comparative Example 1.

Furthermore, the black photosensitive resin composition of Comparative Example 2 including a silver-tin-containing alloy in an amount outside of the range of the invention exhibits deteriorated pattern-forming property and optical density compared with the black photosensitive resin compositions of Examples 1 to 4 including a silver-tin-containing alloy in an amount of about 5 to about 60 wt % based on the total weight of the composition.

In addition, the black photosensitive resin composition of Comparative Example 2 including a cardo-based binder resin with a weight average molecular weight ranging from about 1,000 to about 20,000 g/mol exhibits better resolution than the composition of Comparative Example 3 including a cardo-based binder resin with a weight average molecular weight outside of the range of the invention.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A black photosensitive resin composition, comprising
(A) an organic binder resin;
(B) a reactive unsaturated compound;
(C) a photopolymerization initiator;
(D) a black pigment including carbon black and a silver-tin-containing alloy; and
(E) a solvent,
wherein the silver-tin-containing alloy includes silver and tin in a weight ratio of about 6:4 to about 8:2,
wherein the composition comprises the carbon black and the silver-tin-containing alloy in a weight ratio of about 1:1 to about 1:8, and
wherein the organic binder resin comprises a cardo-based binder resin.

2. The black photosensitive resin composition of claim 1, wherein the black photosensitive resin composition comprises
about 0.5 to about 20 wt % of the organic binder resin (A);
about 1 to about 20 wt % of the reactive unsaturated compound (B);
about 0.1 to about 10 wt % of the photopolymerization initiator (C);
about 1 to about 40 wt % of the black pigment including carbon black and a silver-tin-containing alloy (D); and
balance of the solvent (E).

3. The black photosensitive resin composition of claim 1, wherein the cardo-based binder resin comprises a compound including a repeating unit represented by the following Chemical Formula 1:

[Chemical Formula 1]

wherein, in Chemical Formula 1, $R_{24}$ to $R_{27}$ are the same or different and are independently hydrogen, halogen, or substituted or unsubstituted C1 to C20 alkyl,

$R_{28}$ and $R_{29}$ are the same or different and are independently hydrogen or $CH_2ORa$, wherein Ra is a vinyl group, an acrylic group, or a methacrylic group, $R_{30}$ is hydrogen, substituted or unsubstituted C1 to C20 alkyl, substituted or unsubstituted C2 to C20 alkenyl, an acrylic group, or a methacrylic group,

$Z_1$ is a single bond, O, CO, $SO_2$, CRbRc, SiRdRe, wherein, Rb to Re are the same or different and are independently hydrogen or substituted or unsubstituted C1 to C20 alkyl, or one of functional groups represented by the following Chemical Formulae 2 to 12, and $Z_2$ is an acid anhydride residual group or acid dianhydride residual group,

[Chemical Formula 2]

[Chemical Formula 3]

[Chemical Formula 4]

[Chemical Formula 5]

[Chemical Formula 6]

wherein, in Chemical Formula 6,

Rf is hydrogen, ethyl, $C_2H_4Cl$, $C_2H_4OH$, $CH_2CH=CH_2$, or phenyl,

[Chemical Formula 7]

[Chemical Formula 8]

[Chemical Formula 9]

[Chemical Formula 10]

[Chemical Formula 11]

[Chemical Formula 12]

4. The black photosensitive resin composition of claim 1, wherein the cardo-based binder resin has a weight average molecular weight of about 1,000 to about 20,000 g/mol.

5. The black photosensitive resin composition of claim 1, comprising the silver-tin-containing alloy in an amount of about 5 to about 60 wt % based on the total weight of solids of the black photosensitive resin composition.

6. An article comprising the black photosensitive resin composition of claim 1 applied on a surface of a substrate to form a light blocking layer.

7. A light blocking layer manufactured using the black photosensitive resin composition of claim 1.

8. The light blocking layer of claim 7, wherein the light blocking layer has an optical density of about 4.0 or more at a film thickness of about 0.7 μm or more.

* * * * *